US011079405B1

(12) United States Patent
 Hu et al.

(10) Patent No.: US 11,079,405 B1
(45) Date of Patent: Aug. 3, 2021

(54) METHOD AND APPARATUS FOR DETECTING FERROELECTRIC SIGNAL

(71) Applicant: Taiwan Semiconductor Manufacturing Co., Ltd., Hsinchu (TW)

(72) Inventors: Wei-Shan Hu, New Taipei (TW); Dong Gui, Hsinchu (TW); Jang-Jung Lee, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 16/866,560

(22) Filed: May 5, 2020

(51) Int. Cl.
 *G01Q 60/30* (2010.01)
 *G01Q 60/24* (2010.01)
 *G01Q 60/38* (2010.01)
 *B82Y 35/00* (2011.01)

(52) U.S. Cl.
 CPC .............. *G01Q 60/30* (2013.01); *B82Y 35/00* (2013.01); *G01Q 60/24* (2013.01); *G01Q 60/38* (2013.01)

(58) Field of Classification Search
 CPC ......... G01Q 60/24; G01Q 60/30; B82Y 35/00
 See application file for complete search history.

(56) References Cited

PUBLICATIONS

Hong et al., 'Principle of ferroelectric domain imaging using atomic force microscope' Journal of Applied Physics 89,1377 (Year: 2001).*
Huang et al. 'An artificial intelligence atomic force microscope enabled by machine learning' Nanoscale, 2018, 10, 21320 (Year: 2018).*

* cited by examiner

*Primary Examiner* — Eliza W Osenbaugh-Stewart
(74) *Attorney, Agent, or Firm* — JCIPRNET

(57) ABSTRACT

A method of detecting a ferroelectric signal from a ferroelectric film and a piezoelectric force microscopy (PFM) apparatus are provided. The method includes following steps. An input waveform signal is generated, wherein the input waveform signal includes a plurality of read voltage steps with different voltage levels. The input waveform signal to the ferroelectric film is applied. An atomic force microscope probe scans over a surface of the ferroelectric film to measure a surface topography of the ferroelectric film. A deflection of the atomic force microscope probe is detected when the input waveform signal is applied to a pixel of the ferroelectric film to generate a deflection signal. Spectrum data of the pixel based on the deflection signal is generated. The spectrum data of the pixel is analyzed to determine whether the spectrum data of the pixel is a ferroelectric signal or a non-ferroelectric signal.

20 Claims, 13 Drawing Sheets

METHOD AND APPARATUS FOR DETECTING FERROELECTRIC SIGNAL

BACKGROUND

Scanning probe microscope (SPM) is an instrument to measure a surface topography of a sample in nanometer scale. The SPM has different variations including widely used piezo-response force microscopy (PFM).

The PFM may fail to follow true topography of the sample when large electrostatic force is present between the surface of the sample and the probe tip of the cantilever. As such, it is essential to distinguish a true FE signal from an electrostatic force false signal (e.g., non-FE signal) to improve performance of the PFM. As demand for better measurement performance in nanometer scale, there has grown a need for more advanced PFM and creative techniques for solving the above issue.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
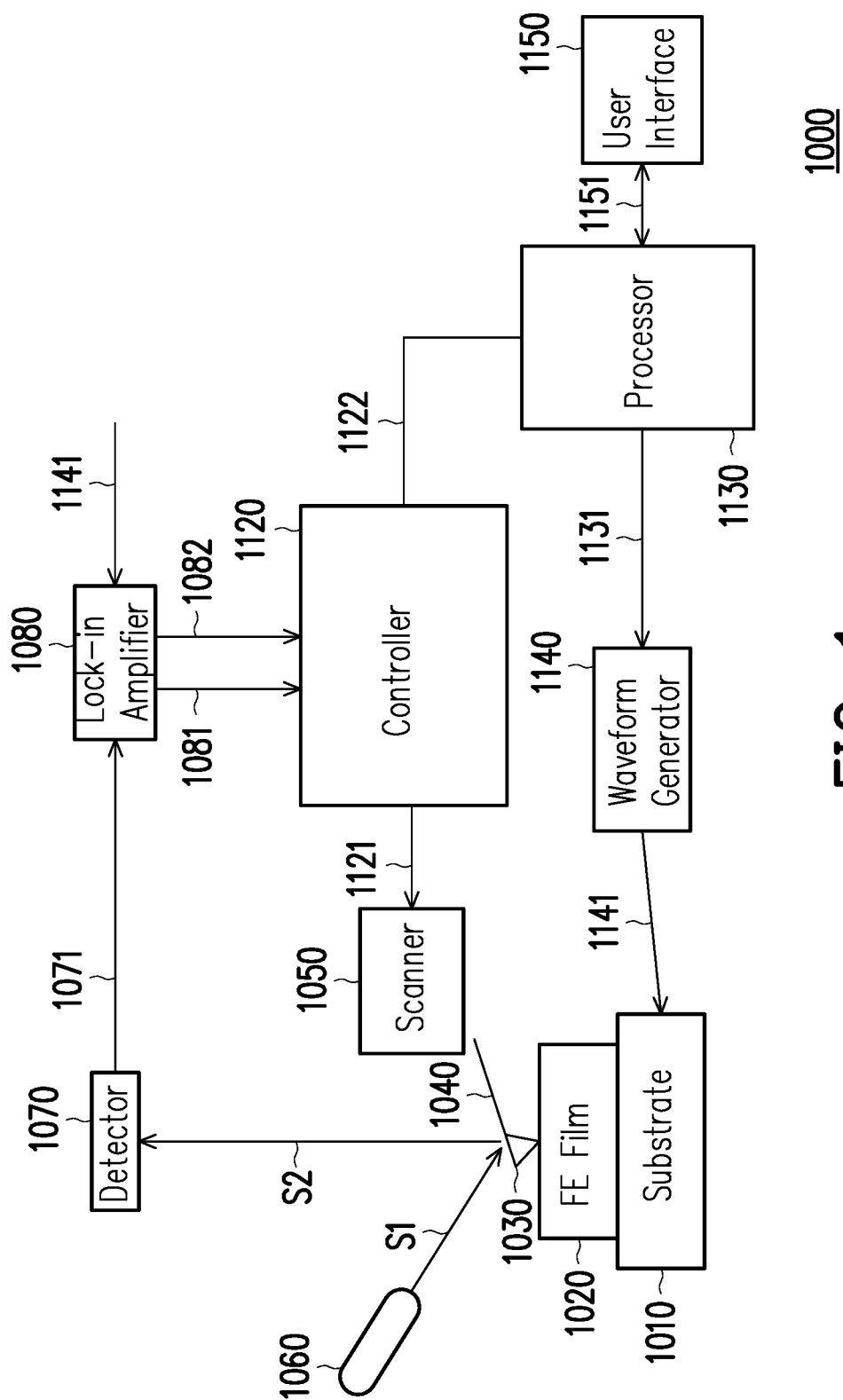
FIG. 1 is a schematic diagram illustrating a PFM apparatus according to some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Referring to FIG. 1, a PFM apparatus 1000 in accordance with some embodiments is illustrated. The PFM 1000 includes a substrate 1010, an atomic force microscope (AFM) probe 1040, a piezoelectric tube scanner 1050, a laser source 1060, a detector 1070, a lock-in amplifier 1080, a controller 1120, a processor 1130, a waveform generator 1140 and a user interface 1150. The substrate 1010 may include a sample holder (not shown) for holding a ferroelectric (FE) film 1020 in an appropriate position during an operation of the PFM 100. The FE film 1020 may have semiconductor wafers and semiconductor devices are disposed thereon. The substrate 1010 may further include electrodes (not shown) that receive input waveform signal 1141 generated by the waveform generator 1140. The received input waveform signal 1141 may be supplied to the FE film 1020 through the electrodes.

The AFM probe 1040 includes a probe tip 1030 which is configured to scan over a surface of the FE film 1020 to read a surface topography of the FE film 1020. In some embodiments, the PFM 1000 may be operated in a number of different modes including a contact mode where the probe tip 1030 is in constant contact with the surface of the FE film 1020, a non-contact mode or a tapping mode where the probe tip 1030 makes no contact or only intermittent contact with the surface of the FE film 1020. In the contact mode, the probe tip 1030 is in hard contact with the surface of the FE film 1020 during scanning over the FE film 1020. The AFM probe 1040 is deflected as it follows the topography of the FE film 1020. In some embodiments, the topography of the FE film 1020 is measured based on the deflection of the AFM probe 1040 when scanning over the surface of the FE film 1020. In some alternative embodiments, the probe tip 1030 is continuously adjusted to maintain a specific deflection of the AFM probe 1040, and the topography of the FE film 1020 is measured based on the adjustment of the probe tip 1030.

The laser source 1060 is configured to emit a laser beam S1 to a surface (e.g., a back surface) of the AFM probe 1040 during the scanning of the FE film 1020. The detector 1070 is configured to detect the deflection of the AFM probe 1040 based on a laser beam S2 that is reflected from the surface of the AFM probe 1040. The deflection of the AFM probe 1040 is caused by an interaction force between the probe tip 1030 of AFM probe 1040 and the surface of the FE film 1020. In some embodiments, the detector 1070 is a position sensitive detector (PSD) that detects deflection of the AFM probe 140 according to the reflected laser beams S2 to generate the deflection signal 1071. The deflection signal 1071 indicates the deflection of the AFM probe 1040.

The waveform generator 1140 is configured to generate and provide an input waveform signal 1141 to the FE film 1020 through the substrate 1010. In some embodiments, the input waveform signal 1141 includes a plurality of sequences in each measurement period, in which each of the sequences includes a plurality of read voltage steps and a plurality of write voltage steps. The write voltage steps are configured to excite the FE film 1020 and the read voltage steps are configured to read the FE signal from the FE film 1020. In some embodiments, the write voltage steps are alternative current (AC) component of the input waveform signal 1141 and the read voltage steps are direct current (DC) component of the input waveform signal 1141. The read voltage steps have different voltage levels and are used as bias voltages between the surface of the FE film 1020 and the probe tip 1030 during read operations. The read operations are configured to measure the FE signal that indicate the topography of the FE film 1020. In some embodiments, each of the read voltage steps corresponds to one of the sequences and a number of the sequences is equal to a number of the read voltage steps.

In some embodiments, the waveform generator 1140 is configured to generate the input waveform signal 1141 based on user setting parameters 1151 that is set through the user interface 1150. The user setting parameters 1151 may include settings of the input waveform signal 1141. For example, the user setting parameters 1151 may include settings about a number of read voltage steps in each sequence, the number of write pulses in each sequence, and a voltage difference between consecutive read voltage steps, and a voltage difference between consecutive write voltage steps.

The lock-in amplifier 1080 is coupled to a detector 1070 to receive the deflection signal 1071 and is configured to capture a probe displacement of the AFM probe 1040 based on the deflection signal 1071. Particularly, the lock-in amplifier 1080 may capture an amplitude 1081 and a phase 1082 of the probe displacement. In some embodiments, the lock-in amplifier 1080 is configured to receive the deflection signal 1071 from the detector 1070 and the input waveform signal 1141 from the waveform generator 1140. The lock-in amplifier 1080 may capture a first component of the deflection signal 1071 that oscillates in-phase with the input waveform signal 1141 and a second component of the deflection signal 1070 that oscillates perpendicular to the phase of the input waveform signal 1141. In other words, the first component of the deflection signal 1071 has the same phase as the input waveform signal 1141, and the second component of the deflection signal 1070 has a phase difference of 90 degrees with the input waveform signal 1141. In some embodiments, the deflection signal 1071 is modulated at a same frequency as the frequency of the input waveform signal 1141. As such, the lock-in amplifier 1080 may output the amplitude 1081 and the phase 1082 of the deflection signal 1071 based on the first component and the second component.

The controller 1120 is configured control operations of the piezoelectric tube scanner 1050 based on at least one of the amplitude 1081 and the phase 1082 of the probe displacement that are outputted from the lock-in amplifier 1080. For example, in the constant force mode, the controller may generate a control signal 1121 based on the amplitude 1081 and the phase 1082 of the deflection signal 1071 to maintain the deflection of the probe tip 1030 at a specific deflection. In the constant force mode, the topography of the FE film 1020 may be generated based on the control signal 1121. In some embodiments, the controller 1120 generates spectrum data of each pixel of the FE film 1020 during scanning. For example, the spectrum data may include the probe displacement of the AFM probe 1040. The controller 1120 may provide the spectrum data of each pixel to the processor 1130 for further processing.

Figure 9A:
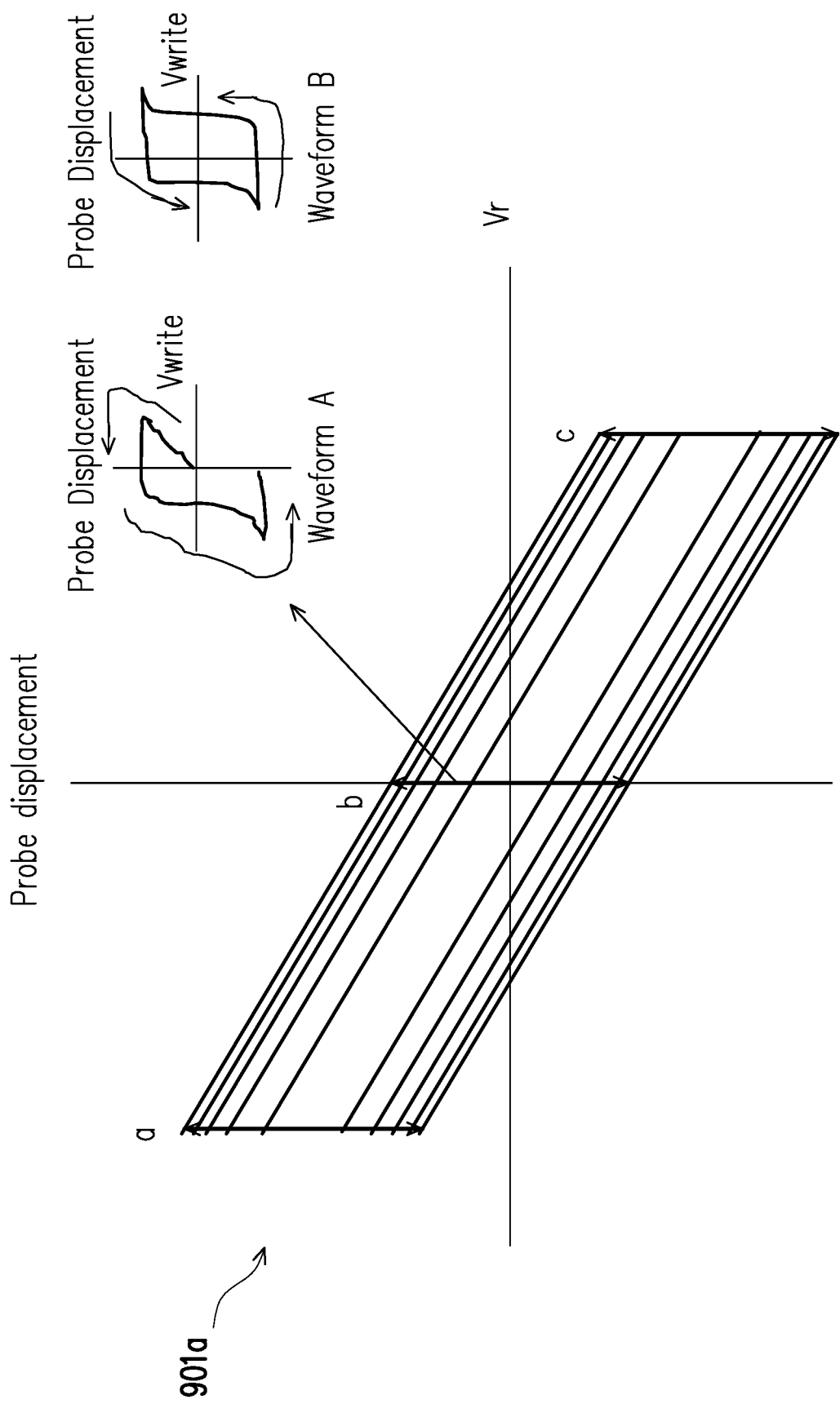
FIGS. 9A through 9C illustrate spectrum data that are determined as ferroelectric signals and non-ferroelectric signal in accordance with some embodiments.
Figure 9B:
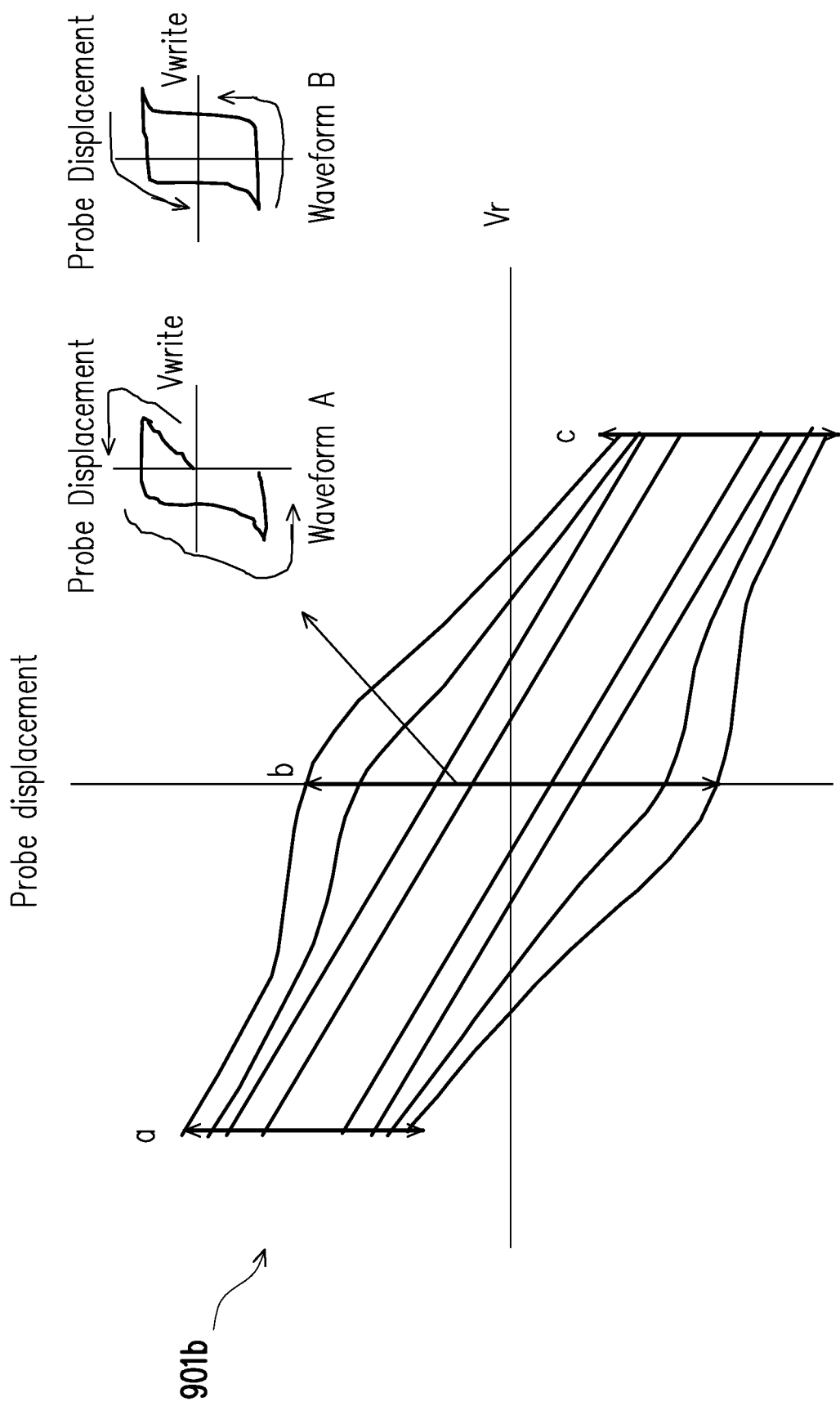
Figure 9C:
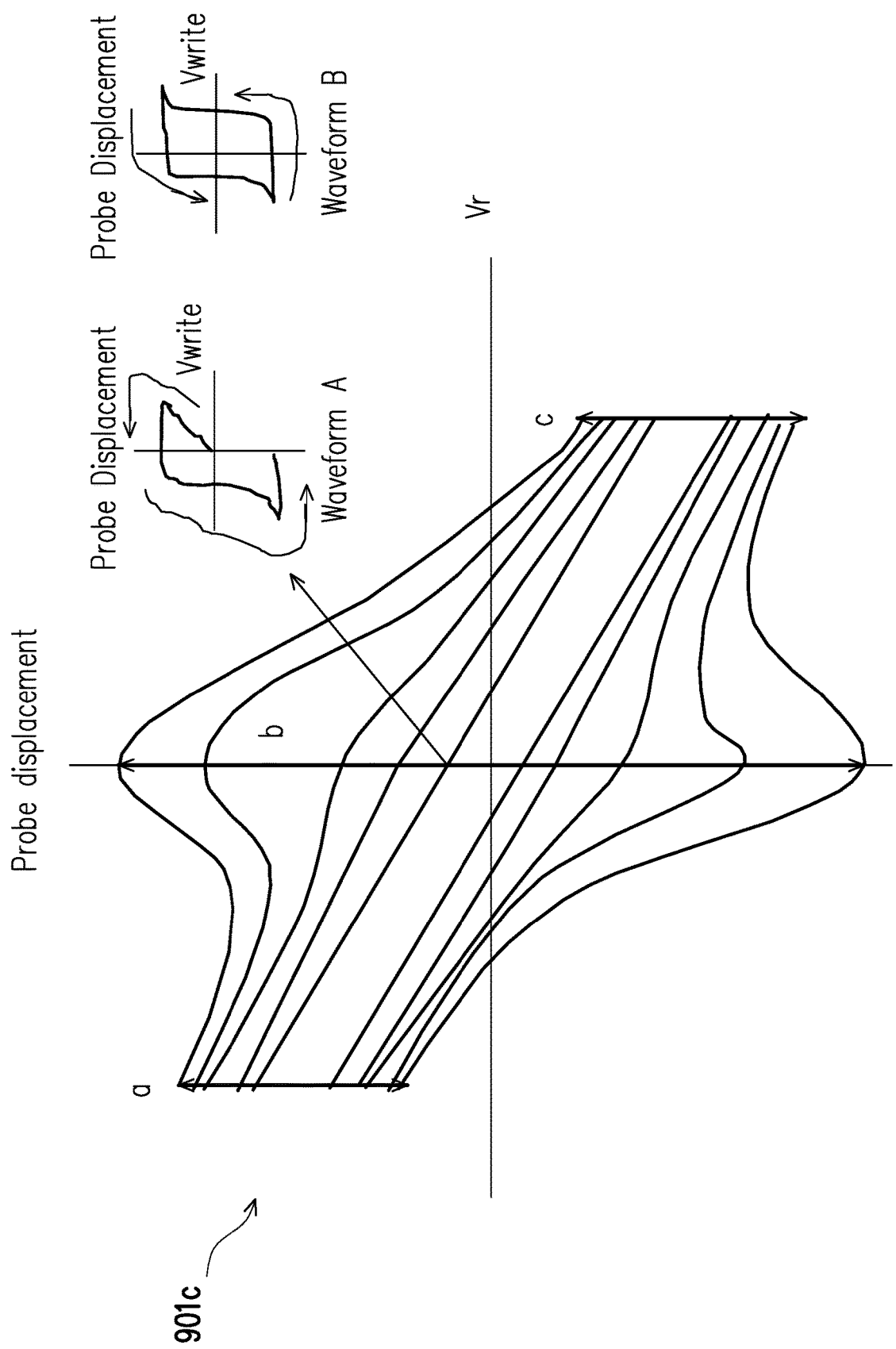

In some embodiments, the processor 1130 may classify the spectrum data of a specific pixel of the FE film to be a FE signal or non-FE signal based on the spectrum data of the specific pixel. For example, if the spectrum data of the specific pixel matches the pattern 603 shown in FIG. 6, the specific data is the FE signal. Otherwise, if the spectrum data of the specific pixel matches the pattern 601 shown in FIG. 6, the specific data is the non-FE signal. In some embodiments, the determination of whether the spectrum data of the specific cell is the FE signal or non-FE signal is determined according to probe displacements obtained from different read voltage steps as shown in FIG. 9A through FIG. 9C.

Figure 2A:
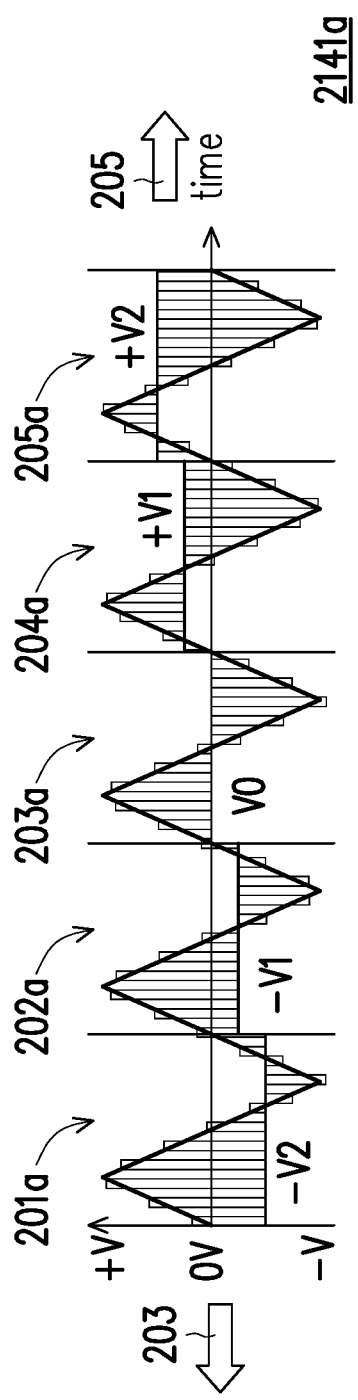
FIGS. 2A to 2C are waveform diagrams illustrating input waveform signals according to some embodiments.
Figure 2B:
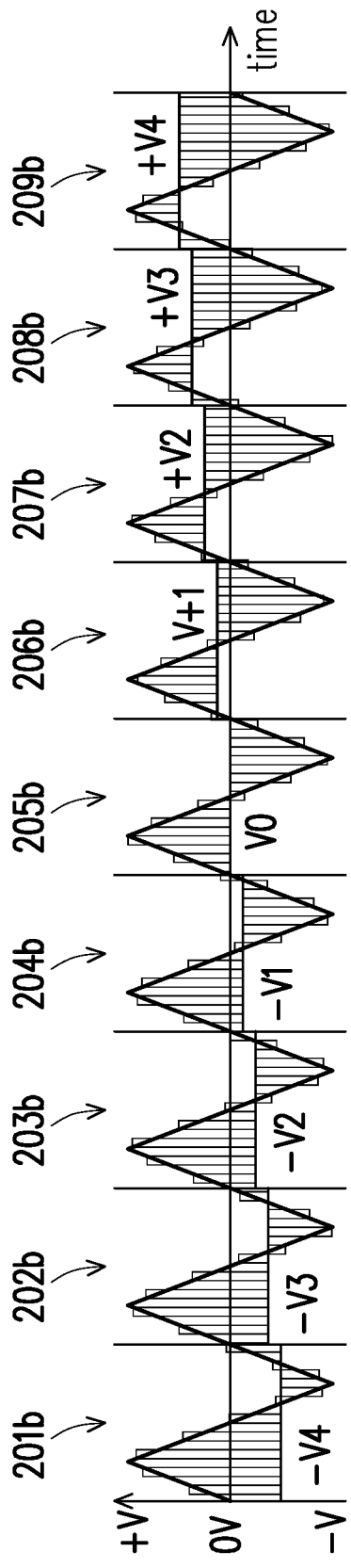
Figure 2C:
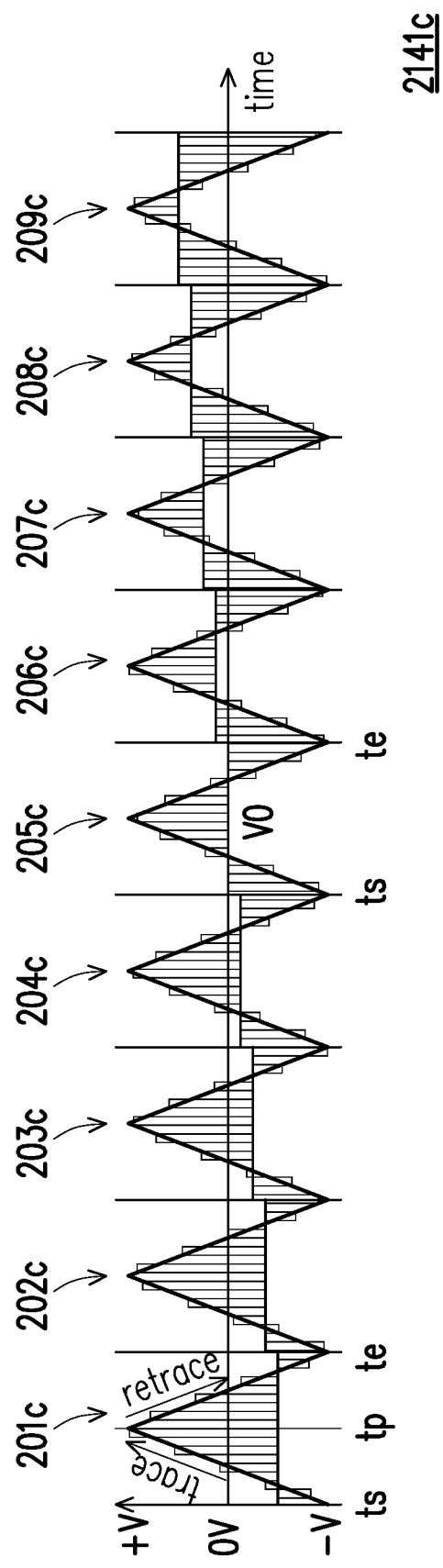
Figure 2D:
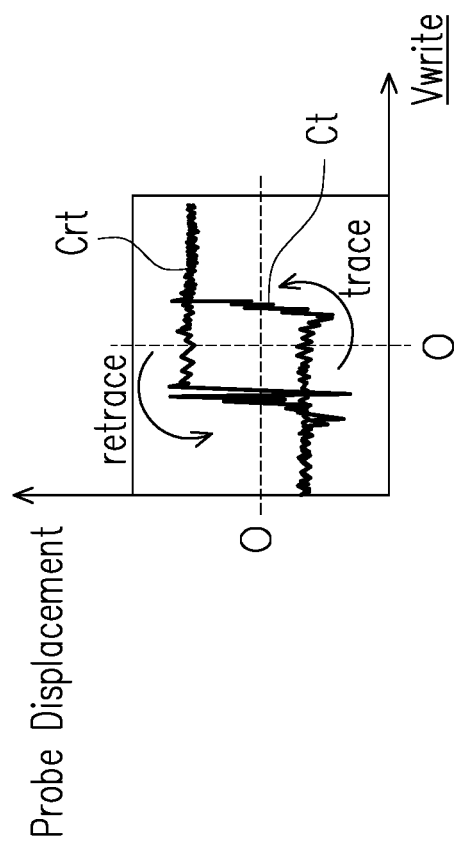
FIG. 2D illustrates a schematic diagram illustrating a probe displacement of the AFM probe with respect to a write voltage according to some embodiments.

Referring to FIG. 1 and FIG. 2D, a probe displacement with respect to a write voltage Vwrite is illustrated in accordance with some embodiments. The vertical axis in FIG. 2D indicates the probe displacement and the horizontal axis in FIG. 2D indicates the write voltage Vwrite that is biased between the probe tip 1030 and the FE film 1020. In each scanning sequence of the PFM apparatus 100, the write voltage Vwrite is applied to the FE film 1020 in trace and retrace phases. The probe displacements corresponding to the trace and retrace phases are illustrated as a trace curve Ct and a retrace curve Crt. The spectrum data of each pixel of the FE film 1020 may include the probe displacement in trace and retrace phases.

Referring to FIG. 1, to measure the topography of the FE film 1020 in vertical or lateral direction, the input waveform signal 1141 having a plurality of read voltage steps and write voltage steps is generated and applied to the FE film to form bias voltage between the probe tip 1030 and the FE film 1020. The piezoelectric tube scanner 1050 moves the AFM probe 1040 over the surface of the FE film 1020, such that the probe tip 1030 may follow the topography of pixels in the FE film 1020. The detector 1070 detects the deflection of the AFM probe 1040 when scanning over each pixel to generate the deflection signal 1071. The lock-in amplifier 1080 captures the amplitude 1081 and phase (or polarization) 1082 of the deflection signal 1071 of each pixel. In a constant height mode, the controller 1120 may generate the spectrum data of each pixel based on at least one of the amplitude 1081 and the phase 1082. In some alternative embodiments, the controller 1120 is configured to continually adjust AFM probe 1040 using the control signal 1121 to maintain the probe tip 1030 at the specific deflection (e.g., the constant force mode). The adjustment signal CS corresponding to a specific pixel forms spectrum data of the specific pixel. The processor may determine whether the spectrum data of each pixel is a FE signal or non-FE signal with only electrostatic charge response based on the spectrum data.

FIGS. 2A to 2C illustrates waveforms of input waveform signals 2141a to 2141c in accordance with some embodiments. The input waveform signals 2141a to 2141c may be same as the input waveform signal 1141 that is generated by the waveform generator 1140 shown in FIG. 1. Referring to FIG. 2A, the input waveform signal 2141a includes a plurality of sequences 201a to 205a in each measurement period. Each of the sequences 201a to 205a corresponds to one of read voltage steps. Particularly, the sequence 201a corresponds to the read voltage step with a voltage level of −V2. In other words, during the sequence 201a, the read voltage step having a voltage level of −V2 is used as a bias voltage of a read operation to the FE film. Similarly, the bias voltage for the read operation is set to −V1 during the sequence 202a, V0 during the sequence 203a, +V1 during the sequence 204a and +V2 the sequence 205a.

In some embodiments, a difference between voltage levels of two consecutive read voltage steps are identical. For example, the difference between the voltage level −V2 and the voltage level −V1 is identical to the difference between the voltage level −V1 and the voltage level V0. In some embodiments, the processor 1130 may determine the voltage levels of −V2 to +V2 based on the number of the sequences in each measurement period and a user input voltage that is inputted from the user interface 1150. For example, when each measurement period has five sequences, the voltage levels of −V2, −V1, V0, +V1 and +V2 may be set to −2 volts, −1 volt, 0 volt, 1 volt and 2 volts, respectively.

In addition, during each of the sequences 201a to 205a, the input waveform signal 2141a may include a plurality of write voltage steps corresponding to a plurality of write pulses. In some embodiments, a pulse width of each of the write pulses are identical, and may be set to a range from 2 milliseconds (ms) to 50 ms. In addition, a voltage level difference between two consecutive voltage pulses may be set to any value in a range from 10 millivolts (mV) to 200 mV. In some embodiments, the pulse width of each of the write pulses and the voltage difference between two consecutive voltage pulses are set by the user through the user interface 1150.

In some embodiments, at least one read operation is performed after a write pulse is applied to the FE film. The number of the read operations after the application of write pulse may be determined according to tradeoff between the reading time and the accuracy of the reading operation. As the number of read operations increases, the processing time of the reading operation is longer and the accuracy of the read operation is better, and vice versa. In some embodiments, the number of read operations performed after the write pulse is set by the user through the user interface 1150.

Arrows 203 and 205 in FIG. 2A indicate ramp directions of the read voltage steps in the input waveform signal. The user may set the ramp direction of the read voltage steps through the user interface 1150 shown in FIG. 1 to an increment direction (arrow 205) from −V2 to +V2 or a decrement direction (arrow 203) from +V2 to −V2.

In FIG. 2A, there are five sequences 201a to 205a in each measurement period, but the disclosure is not limited to any specific number of the sequences in each measurement period. The number of sequences 201a to 205a in the measurement period is determined based on tradeoff between accuracy of the measurement and cost (e.g., data storage, processing time) for the measurement. For example, the more sequences in each measurement period may output more accurate measurement but require more data storage and processing time. By contrast, the less sequences in each measurement period may output less accurate measurement but require less data storage and processing time.

Referring to FIG. 2B, the waveform diagram of an input waveform signal 2141b including a plurality of sequences 201b to 209b in each measurement period, in accordance with some embodiments, is illustrated. The input waveform signal 2141b is divided into sequences 201b to 209b, in which each of the sequences 201b to 209b corresponds to one of the read voltage steps −V4 to +V4. A difference between the input waveform signal 2141b and the input waveform signal 2141a is that the input waveform signal 2141b includes more sequences in each measurement period than the input waveform signal 2141a. For example, the input waveform signal 2141b includes nine sequences in each measurement period while the input waveform signal 2141a includes five sequences in each measurement period. As such, the input waveform signal 2141b may cause the PFM apparatus 1000 to generate more accurate measurement but requires more data storage space and processing time. It is noted that nine sequences 201b to 209b in the input waveform signal 2141b and five sequences 201a to 205a in the input waveform signal 2141a are for illustration purpose only. Any other number of sequences in each measurement period falls within the scope of the disclosure. In some embodiments, the voltage levels of each read voltage step is determined according to the number of the sequences in each measurement period and a user input voltage that is inputted from the user interface 1150. For example, when user input voltage is 2 and each measurement period has nine sequences, the voltage levels of −V2 to +V2 may be set to −2 volts, −1.5 volts, −1 volt, −0.5 volt, 0 volt, 0.5 volt, 1 volt, 1.5 volts and 2 volts, respectively.

Referring to FIG. 2C, a waveform diagram of the input waveform signal 2141c includes sequences 201c to 209c in each measurement period, in accordance with some embodiments, is illustrated. Each of the sequences 201c to 209c corresponds to one of the read voltage steps. Each of the sequences 201c to 209c starts at a start timing ts and ends at an end timing te, in which the start timing ts and the end timing te correspond to the lowest voltage level of the input waveform signal 3141a. Within each of the sequences 201c to 209c, there is a peak timing tp which corresponds to a highest voltage level of the input waveform signal 2141c.

A difference between the input waveform signal 2141c shown in FIG. 2C and the input waveform signal 2141b shown in FIG. 2B is the waveform of the input waveform signal within each of the sequences. Particularly, in FIG. 2B, a start timing ts of the input waveform signal 2141c and the end timing te of the input waveform signal 2141b correspond to the voltage level of zero volts (e.g., intersection between the input waveform signal 2141b and the horizontal axis). On the other hand, in FIG. 2C, a start timing ts and the end timing te of the input waveform signal 2141b correspond to the voltage level of −V volts that is different from the zero volts. It is noted that the input waveform signals 2141a to 2141c shown in FIG. 2A to FIG. 2C shows some exemplary input waveform signals that may apply to the FE film 1020 in FIG. 1 for the topography measurement. Other variations of the input waveform signal that are derived from the input waveform signals 2141a to 2141c fall within the scope of the disclosure. For example, the input waveform signals that are generated by changing the number of sequences in each measurement period, the start timing, end timing of each sequences, or values of the read voltage levels and write voltage levels may be used for the PFM apparatus 1000 to measure the topography of the FE film 1020.

Figure 6:
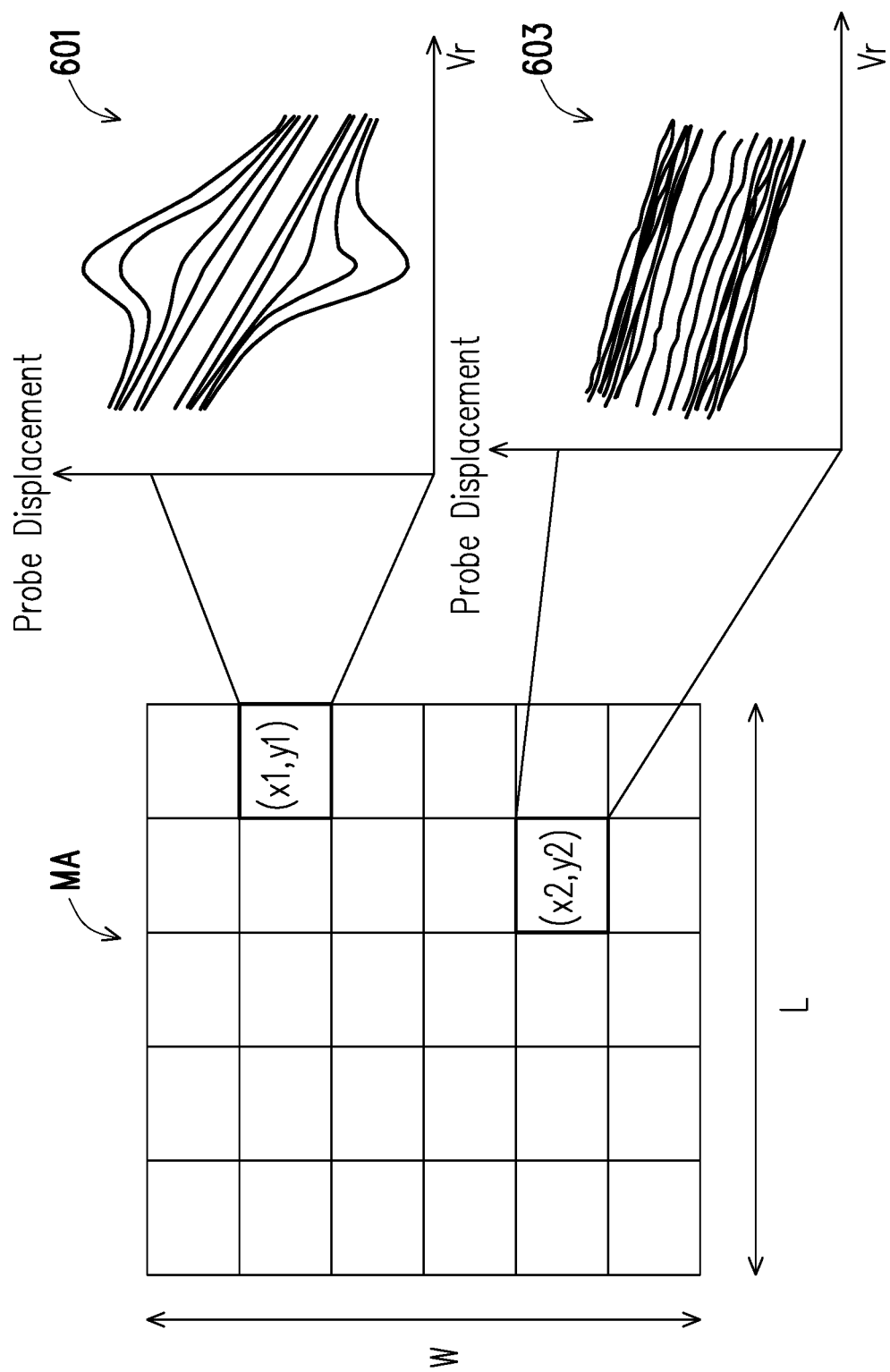
FIG. 6 illustrates a mapping array that records spectrum data of a pixel area in a ferroelectric film according to some embodiments.

FIG. 2C further shows a trace period and a retrace period of a scan line (not shown), in which the input waveform signal 2141c increases from the lowest voltage level (e.g., −V) at the start timing ts to the highest voltage level (e.g., +V) at the peak timing tp in the trace period; and the input waveform signal 2141c decreases from the highest voltage level at the peak timing tp to the lowest voltage level at the end timing te in the retrace period. Referring to FIG. 1 and FIG. 0.2C, when the input waveform signal 2141c is applied to the FE film 1020, the detector 1070 may detect the deflection of the AFM probe 1030 to generate deflection signals 1071 corresponding to each of the read voltage steps −V4 to V4, and the lock-in amplifier 1080 may capture amplitudes 1081 and phases 1082 of the deflection signals 1071. The phases 1082 of the deflection signals 1071 may include trace and retrace phases with respect to the read voltage steps −V4 to V4 in the sequences 201*c* to 209*c*. The spectrum data of each pixel may include the trace and retrace phases of the deflection signal 1071. In some embodiments, the spectrum data of the specific pixel may be compared with a set of predetermined patterns to determine whether the spectrum data of the specific pixel is the FE signal or the non-FE signal. Referring to FIG. 6, the spectrum data 601 with the hysteresis loop corresponds to the FE signal and the and the spectrum data 603 corresponds a non-FE signal with only electrostatic charge response.

Figure 3A:
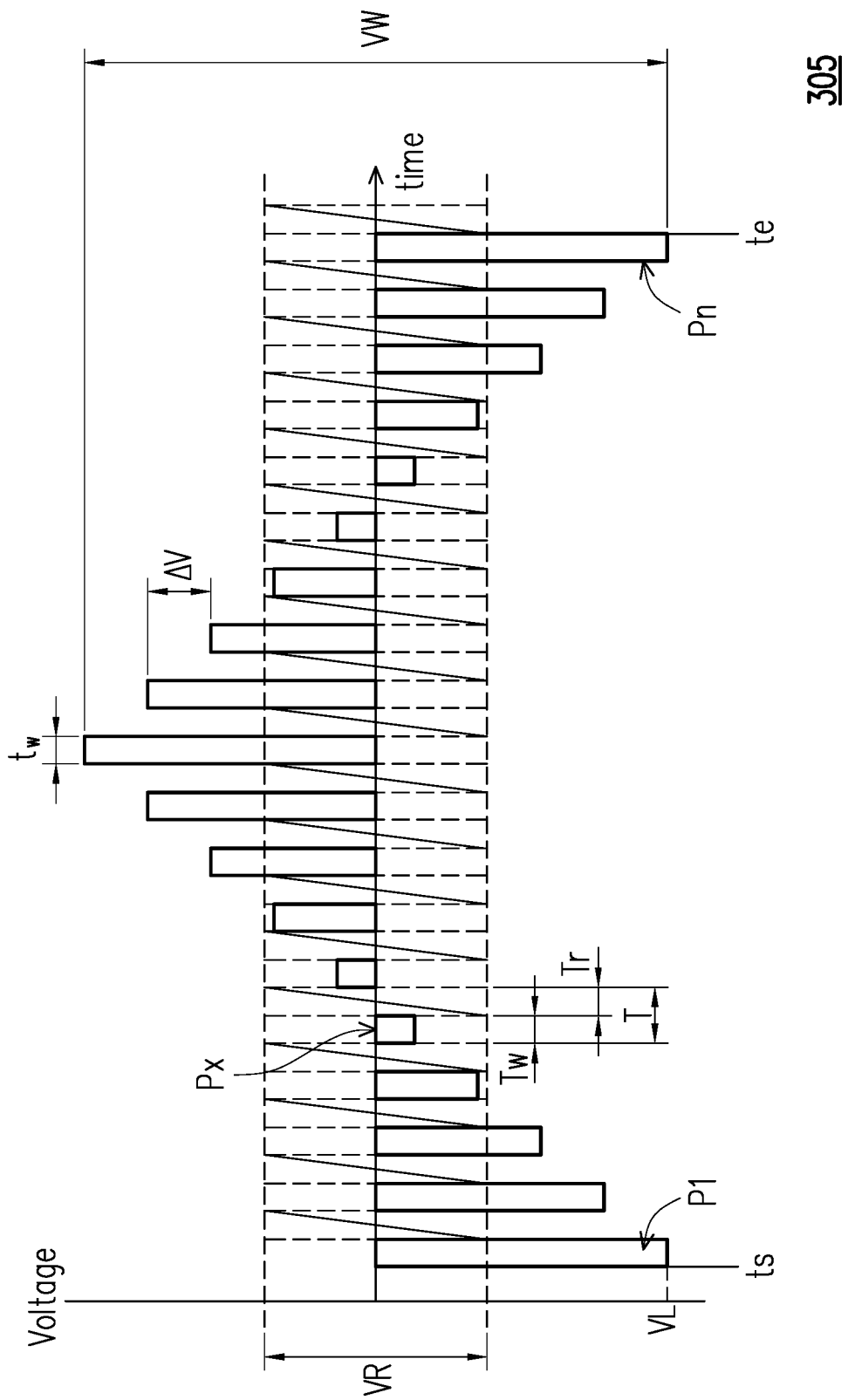
FIGS. 3A to 3B illustrate a sequence in an input waveform signal according to some embodiments.
Figure 3B:
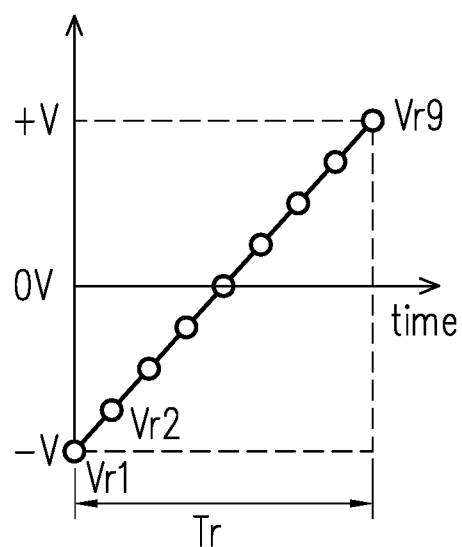

Referring to FIG. 3A, a sequence 305 of an input waveform signal that is generated by the waveform generator 1140 in FIG. 1 in accordance with some embodiments is illustrated. The sequence 305 starts at a start timing is and ends at an end timing te. The sequence 305 includes a plurality of write voltage steps corresponding to a plurality of write pulses P1 to Pn, in which each of the write pulses P1 to Pn has a pulse width $t_w$, and two consecutive write pulses differ ΔV from each other. In some embodiments, the pulse width $t_w$ and the pulse difference ΔV is set by the user through user interface 1150. The sequence 305 further includes a plurality of read voltage steps following each of the write pulses P1 through Pn. Referring to FIG. 3A and FIG. 3B, each of the write pulses P1 through Pn is followed by the read voltage steps with voltage levels of Vr1 through Vr9, respectively. Particularly, the sequence 305 is divided into a plurality of time intervals T, where each of the time intervals T includes a write period Tw followed by a read period Tr. A writing pulse Px of the input waveform signal is supplied to the FE film 1020 in the write period Tw; and the read operation using the read voltage steps Vr1 to Vr9 are performed in the read period Tr. Voltage levels of the write pulses are limited to be within a write voltage range VW and voltage levels of the read voltage steps are limited to be within a read voltage range VR.

In some embodiments, the read voltage steps Vr1 to Vr9 are arranged in increment, but in some other embodiments, the read voltage steps Vr1 to Vr9 may be arranged in decrement. Referring to FIG. 1, FIG. 3A and FIG. 3B, when the input waveform signal having the sequence 305 is applied to a specific pixel of the FE film 1020, the write pulses P1 to Pn are sequentially applied to the specific pixel of the FE film 1020. After the application of each write pulse, multiple read operations are performed to read the response from the specific pixel using the read voltage steps Vr1 to Vr9 as bias voltages. During each of the read operations, the detector 1070 detects the deflection of the AFM probe 1040 to output the deflection signal 1071 corresponding to each of the read voltage steps Vr1 to Vr9. The lock-in amplifier 1080 captures amplitudes 1081 and phases 1082 of the deflection signals 1071 to generate the spectrum data of the specific pixel. For example, the spectrum data of the specific pixel may include the phases 1082 of the deflection signals 1071 with respect to the bias voltages. The controller 1120 or the processor 1130 may determine whether the deflection signal 1071 is a ferroelectric signal or a non-ferroelectric signal (e.g., an electrostatic force signal) based on the spectrum data of the specific pixel. The spectrum data 601 shown in FIG. 6 is an example of the FE signal; and the spectrum data 603 shown in FIG. 6 is an example of a non-FE signal with only electrostatic charge response. As the sequence 305 shown in FIG. 3A and FIG. 3B causes the PFM 1000 performing multiple read operations using the read voltage steps Vr1 to Vr9 after the application of each write pulse, the spectrum data in each pixel of the FE film 1020 contain more information for distinguishing the FE signal from the non-F signal. Accordingly, the accuracy of the determination is improved.

Figure 4:
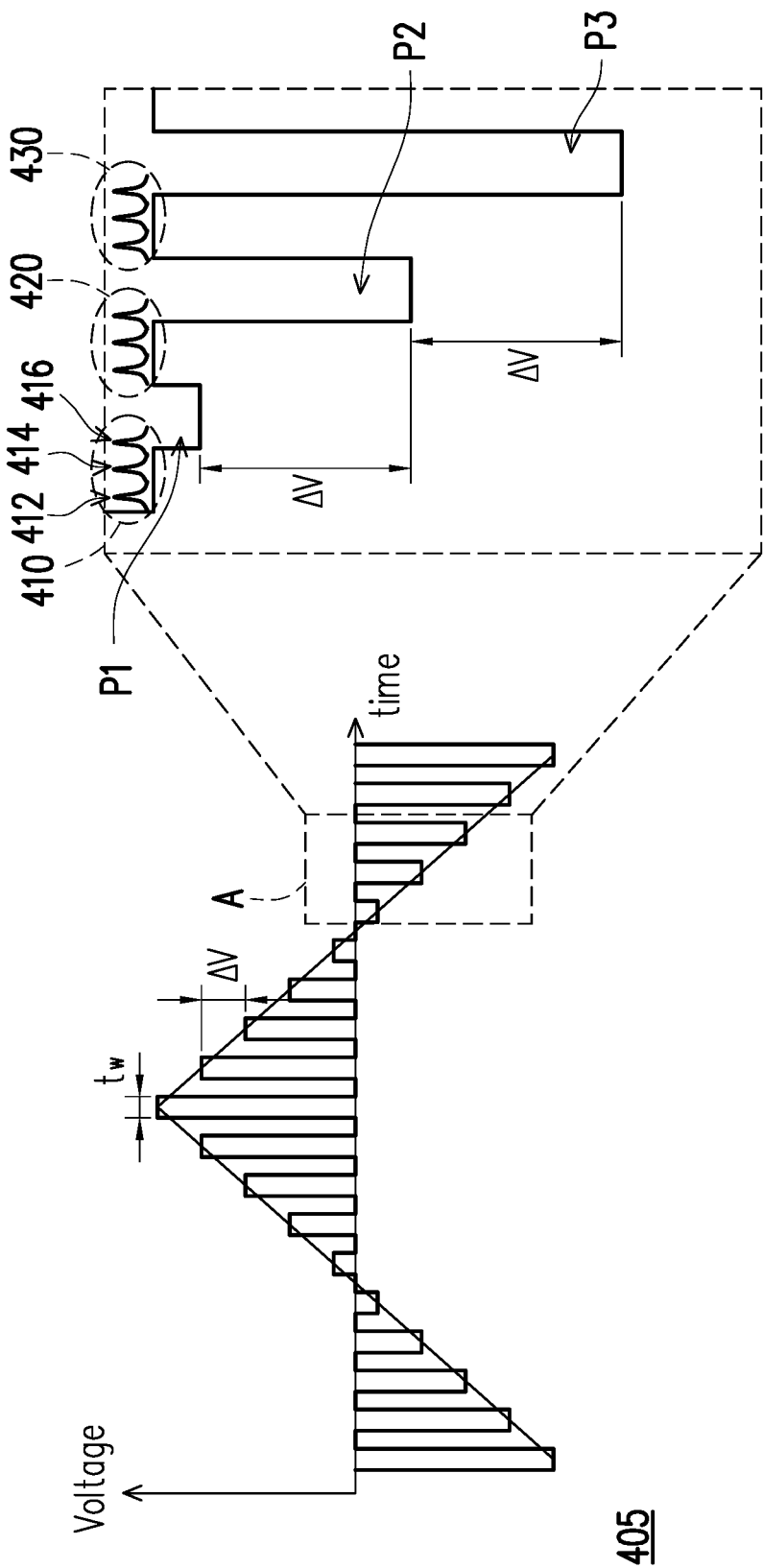
FIGS. 4 to 5 illustrates sequences of input waveform signals according to some embodiments.

Referring to FIG. 4, a sequence 405 of an input waveform signal in accordance with some embodiments is illustrated. The sequence 405 may be same as the sequence 203*a* shown in FIG. 2*a* and the sequence 205*b* shown in FIG. 2B. FIG. 4A further shows a zoomed-in portion A of the sequence 405*a* including consecutive write pulses P1, P2 and P3. A voltage level of the write pulse P1 is smaller than a voltage level of the write pulse P2 for AV, and the voltage level of the write pulse P2 is smaller than a voltage level of the write pulse P3 for AV. Each of the write pulses P1, P2 and P3 is followed by read sets 410, 420 and 430, respectively. In some embodiments, each of the write pulses P1, P2 and P3 are applied during an on-field period, and each of the read sets 410, 420 and 430 are performed in the off-field period, wherein the on-field period and the off-field period are not overlapped each other, and timings for the on-field period and off-field period can be recorded individually. As such, the signal timings of the read sets 410 to 430 may be recorded, and the FE signal generated by performing the read set 410 to 430 are time-dependent FE signal.

In some embodiments, each of the read sets 410, 420 and 430 may include multiple consecutive read operations, where timings associated with each read operation of the read sets are recorded. For example, the read set 410 may include three consecutive read operations 412, 414 and 416 that perform the reading right after the application of the write pulse prior to the write pulse P1, where the signal timings associated with the consecutive read operations 412, 414 and 416 are recorded. As the signal timings associated with the read operations in the read set are recorded, the PFM (e.g., PFM 1000 in FIG. 1) may output time-dependent FE signals when performing the read operations of the read set.

In some embodiments, a selected signal timing is selected among the signal timings associated with the read operations of each read set based on a noise level in the time-dependent FE signals. In other words, the selected signal timing is selected for purpose of minimizing noises in the output FE signal. For example, if the read operation 412 of the read set 410 generates the least noise in the output FE signal among the read operations of the read set 410, the signal timing associated with the read operation is the selected signal timing. In a real operation mode, the selected signal timing is used for read. For example, when the timing signal associated with the read operation 412 is the selected timing signal, the real operation mode will not perform all the read operations 412, 414 and 416 of the read set 410. Instead, the real operation mode only performs the read operation 412 after the application of the write pulse prior to the write pulse P1. In this way, the noise level of the output FE signal is reduced, and the processing time for the reading the FE film (e.g., FE film 1020 is reduced). Accordingly, the accuracy and stability of the reading is guaranteed.

Figure 5:
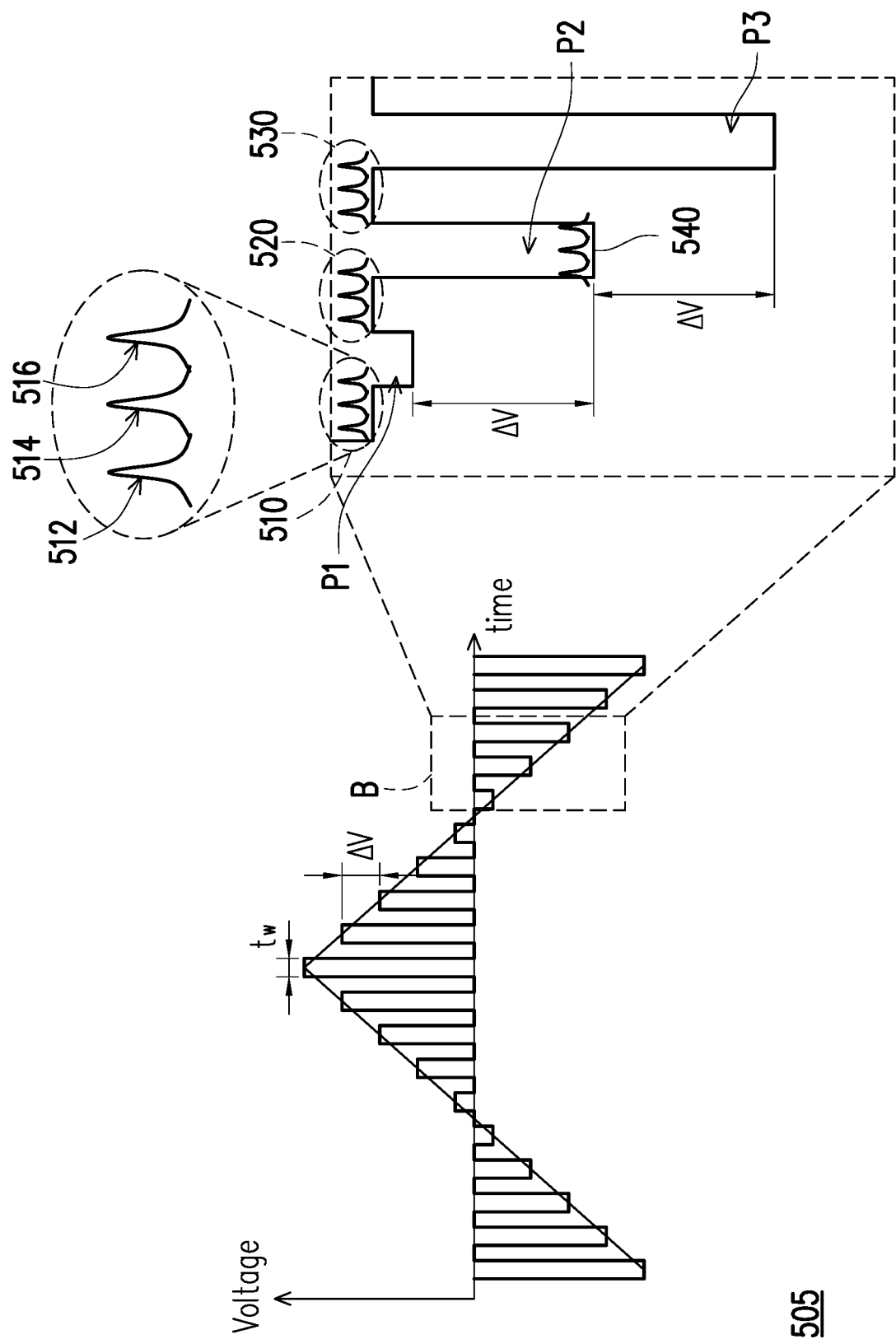

Referring to FIG. 5, a sequence 505 of an input waveform signal and a zoomed-in portion B of the sequence 505 in accordance with some embodiments are illustrated. The zoomed-in portion B of the input waveform signal 5141 includes consecutive write pulses P1 to P3 being followed by the read sets 510 to 530, respectively. The write pulses P1 to P3 and the read set 510 to 530 in FIG. 5 are similar to the write pulses P1 to P3 and the read set 410 to 430 in FIG. 4, thus the detailed description about the write pulses P1 to P3 and the read sets 510 to 530 is omitted hereafter.

A difference between the zoom-in portion B of the sequence 505 in FIG. 5 and the zoom-in portion A of the sequence 405 in FIG. 4 is that then FIG. 4 is that the zoom-in portion B further includes a read set 540 that is performed at the same time (during the on-field period of the write pulse P2). In other words, the sequence 505 in FIG. 5 may cause the PFM 1000 to perform the read operations or the surface measurement of the FE film in both off-field period and on-field period of the write pulses.

In some embodiments, each of the read sets 510 to 540 may include a plurality of consecutive read operations, where signal timings associated with the consecutive read operations of each read set is recorded. For example, the read set 510 may include the read operations 512, 514 and 516 that are performed consecutively but in different timings, where signal timings associated with the read operations 512, 514 and 516 are recorded. Accordingly, the FE signals outputted by the consecutive read operations in the read set 510 to 540 are time-dependent FE signals. In some embodiments, a signal timing among the signal timings associated with the read operations of the read sets 510 to 540 is selected based on a noise level in the time-dependent FE signals. For example, the selected signal timing is associated with the read operation that output the least noise level in the time-dependent FE signal. In a real operation mode, the selected signal timing is used for read. In this way, the noise level of the output FE signal is reduced, and the processing time for the reading the FE film (e.g., FE film 1020) is reduced.

In some embodiments, the spectrum data of a plurality of pixels of the FE film (e.g., FE film 1020) that are generated through the measurements are stored in a mapping array. FIG. 6 illustrates a mapping array MA that stores spectrum data of a pixel area in the FE film in accordance with some embodiments. The mapping array MA has a length of L and a width of W that may be set according to the user's preference through the user interface 1150. In some embodiments, the spectrum data of the pixels includes phases of deflection signal with respect to the bias voltages applied to the FE film. Referring to FIG. 1 and FIG. 6, when the input waveform signal 1141 is applied to the FE film 1020, the deflection signal 1071 is detected by the detector 1070 and the phase of the deflection signal 1071 is captured by the lock-in amplifier 1080. The phase corresponding to each of the pixels in the FE film is stored in a location of the mapping array MA. As shown in FIG. 6, the spectrum data 601 of a pixel is recorded at a location (x1, y1) of the mapping array MA, and the spectrum data 603 of another pixel is recorded at a location (x2, y2) of the mapping array MA. In some embodiments, the spectrum data 601 recorded at the location (x1, y1) is an example of the FE signal being contaminated by noises (e.g., electrostatic force false signal); and the spectrum data 603 recorded at the location (x2, y2) is an example of the non-FE signal with only electrostatic charge response. In this way, the FE signal is distinguishable from the non-FE signal with only electrostatic charge response.

Figure 7:
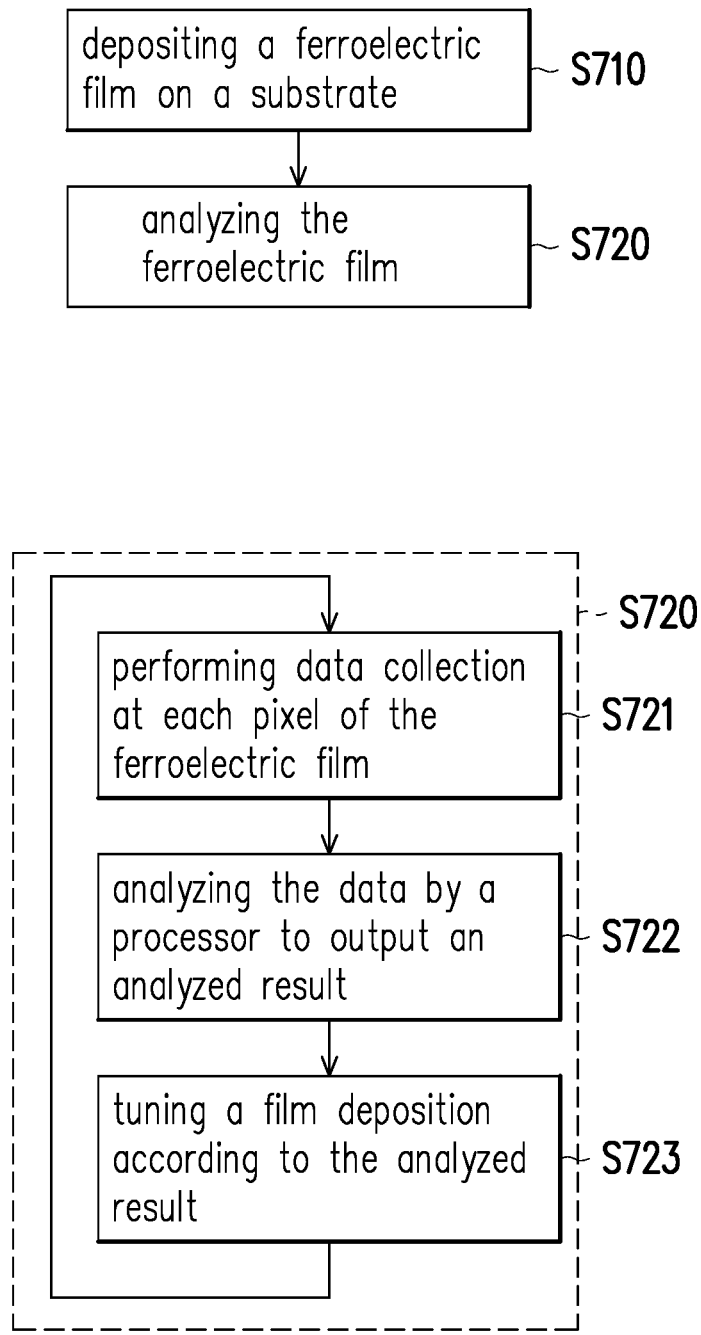
FIG. 7 is a flowchart diagram illustrating an operating method of a PFM according to some embodiments.

Referring to FIG. 7, an operating method of a PFM in accordance with some embodiments of the disclosure is illustrated. In step S710, a FE film is disposed on a substrate for scanning a surface of the FE film using the PFM apparatus (e.g., PFM apparatus 1000 in FIG. 1). In step S720, the FE film is analyzed to determine whether the response outputted by the PFM apparatus is a true FE signal or a non-FE signal with only electrostatic charge response.

In some embodiments, the step S720 includes an iteration of sub-steps S721 to S723. In the sub-step S721, the method performs a data collection at each pixel of the FE film. Referring to FIG. 1 and FIG. 7, the input waveform signal 1141 including a plurality of read voltage steps is generated and provided to the FE film 1020. The AFM probe 1040 is moved across the pixels of the FE film 1020, and the deflection of the AFM probe 1040 is detected by the detector 1070 to output the deflection signal 1071. The phase and amplitude of the deflection signal 1071 may be captured by the lock-in amplifier 1080, and the spectrum data of the pixels of the FE film 1020 may include the phases of the deflection signal 1071 with respect to the read voltage steps. In this way, the spectrum data at each pixel of the FE film 1020 is collected.

In the sub-step S722, the data collected at each pixel of the FE film are analyzed (e.g., by a processor) to obtain an analyzed result. In some embodiments, the processor may determine whether the spectrum data in each pixel has a characteristic of a FE material. For example, the response of FE material exposed to bias voltages may have a hysteresis loop. The processor may determine whether the response (e.g., spectrum data) of the pixel with respect to the read voltage steps has the hysteresis loop to determine that the response of the pixel is the true FE signal.

In the sub-step S723, the deposition of the FE film may be tuned according to the analyzed result so as to obtain the optimal deposition of the FE film for scanning with respect to reducing noises. For example, if the response of the pixels in the FE film indicates that the response from FE film is non-FE signal. It indicates that the probe tip of the AFM probe does not follow the true topography of the FE film. Accordingly, the deposition of the FE film may be tuned by increasing or decreasing dopant quantity to the FE film so as to control the FE property of the FE film.

Some embodiments of the invention apply machine learning and data mining algorithms for analyzing data in PFM apparatus. Machine learning is a branch of artificial intelligence that involves the construction and study of systems that can learn from data. Machine learning and data mining algorithm applied to embodiments of the invention distinguish a non-FE signal from the true FE signal.

For example, the FE property (e.g., property of a hysteresis loop) in the spectrum data of each pixel has strong correlation to classification result (e.g., the true FE signal or the non-FE signal). As aforementioned, the FE property may be characterized by a hysteresis loop that is formed by a trace curve Ct and a retrace curve Crt of the deflection signals with different write voltages Vwrite according to a read voltage step in FIG. 2D. The hysteresis loop may be characterized by the phase magnitudes of the trace curve Ct and the retrace curve Crt and coercive voltages of the trace and retrace curves. In other words, the FE property in spectrum data may be represented by the phase magnitudes of the trace phase curve Ct and retrace curve Crt in different write voltage steps and read voltage steps and coercive voltages of the trace and retrace curves.

In some embodiments, the classification result and the spectrum data (or the FE property of the spectrum data) may be inputted as the training data for the machine learning and data mining algorithms. In an example, the patterns of the spectrum data and its classification result may be used as training data for the machine learning algorithms. Patterns 601 and 603 in FIG. 6 and the spectrum data presented in FIGS. 9A-9C are inputted as the training data for the machine learning and data mining algorithms.

In an alternative example, the classification result and the FE property that is characterized by the phase magnitudes may be used as training data of the machine learning algorithms. The machine learning and the data mining algorithms are configured to find rules or relationships between the classification result and the spectrum data. Once the training of the machine learning algorithms is done, the found rules or relationships are leveraged to predict the classification result of an input data spectrum. In some embodiments, the step S722 in FIG. 7 may include analyzing the spectrum data of each pixel based on the machine learning and data mining algorithms based on the found rules or relationship between the spectrum data and the classification result obtained in the training of the machine learning and data mining algorithms.

FIGS. 9A through 9C illustrate spectrum data that are determined as ferroelectric signals and non-ferroelectric signal in accordance with some embodiments. The spectrum data in FIGS. 9A-9C with probe displacements in Y-axis and read voltages Vr in X-axis comprises a first probe displacement, a second probe displacement and a third probe displacement that correspond to a first read voltage step a, a second read voltage step b and a third read voltage step c of the input waveform signal (i.e., a waveform A or a waveform B). Take the second probe displacement in the second voltage step b for example, the value of the read voltage Vr is the first voltage step b, the input waveform signal may be two types: the waveform A or the waveform B. In waveform A, the write voltage Vwrite may the same as the sequences 201a to 205a in FIG. 2A and the sequences 201b to 209b in FIG. 2B, and may change it's value from 0V as a start point to +V, from +V back to −V through 0V, and from −V to 0V in one sequence. In waveform B, the write voltage Vwrite may the same as the sequences 201c to 205c in FIG. 2C, and may change it's value from −V as a start point to +V through 0V and from +V back to −V through 0V in one sequence. The second probe displacement in the second voltage step b is presented in the Y-axis of the waveform A or the waveform B. The waveform A or the waveform B is the relationship between the write voltages Vwrite and the probe displacement.

Here is an explanation of the spectrum data 901a, 901b, and 901c in FIGS. 9A-9C. The spectrum data 901a, 901b, or 901c in FIGS. 9A-9C may presented like a water pipe, the line of the second voltage step b may be known as a cross line, and the cross-section is presented as the waveform A or the waveform B. In the spectrum data 901a of FIG. 9A, because the different values of the probe displacements (i.e., the difference between a highest value of the probe displacement and a lowest value of the probe displacement) of the first read voltage step a, the second read voltage step b, and the read voltage step c have the same width in the probe displacement, it means the signals in the read voltage steps a, b, and c are translation motion in these three locations. Such that, the spectrum data 901a of FIG. 9A do not have the ferroelectric signal inside. In the spectrum data 901b of FIG. 9B, because the different value of the probe displacements of the second read voltage step b is slightly greater than the different value of the probe displacements of the first read voltage step a and the different value of the probe displacements of the third read voltage step c, it means the signals in the read voltage steps b has weak ferroelectric signal inside. In the spectrum data 901c of FIG. 9C, because the different value of the probe displacements of the second read voltage step b is greater than the different value of the probe displacements of the first read voltage step a and the different value of the probe displacements of the third read voltage step c, it means the signals in the read voltage steps b has strong ferroelectric signal inside.

The machine learning and data mining algorithms of the step S722 in FIG. 7 operated by the processor may determine the difference between the second probe displacement of the second read voltage step b and the first probe displacement of the first read voltage step a and the difference between the second probe displacement of the first read voltage step b and the third probe displacement of the third read voltage step c for analyzing the spectrum data to determine whether the spectrum data of the pixel has a ferroelectric signal or not. In detail, when the difference between the second probe displacement of the second read voltage step b and the first probe displacement of the first read voltage step a and the difference between the second probe displacement the second read voltage step b and the third probe displacement the third read voltage step c are smaller than a threshold value, the processor, the machine learning algorithm or the data mining algorithm determines that the spectrum data of the pixel is the non-ferroelectric signal. When the difference between the second probe displacement of the second read voltage step b and the first probe displacement of the first read voltage step a and the difference between the second probe displacement the second read voltage step b and the third probe displacement the third read voltage step c are not smaller than a threshold value, the processor, the machine learning algorithm or the data mining algorithm determines that the spectrum data of the pixel is the ferroelectric signal.

Figure 8:
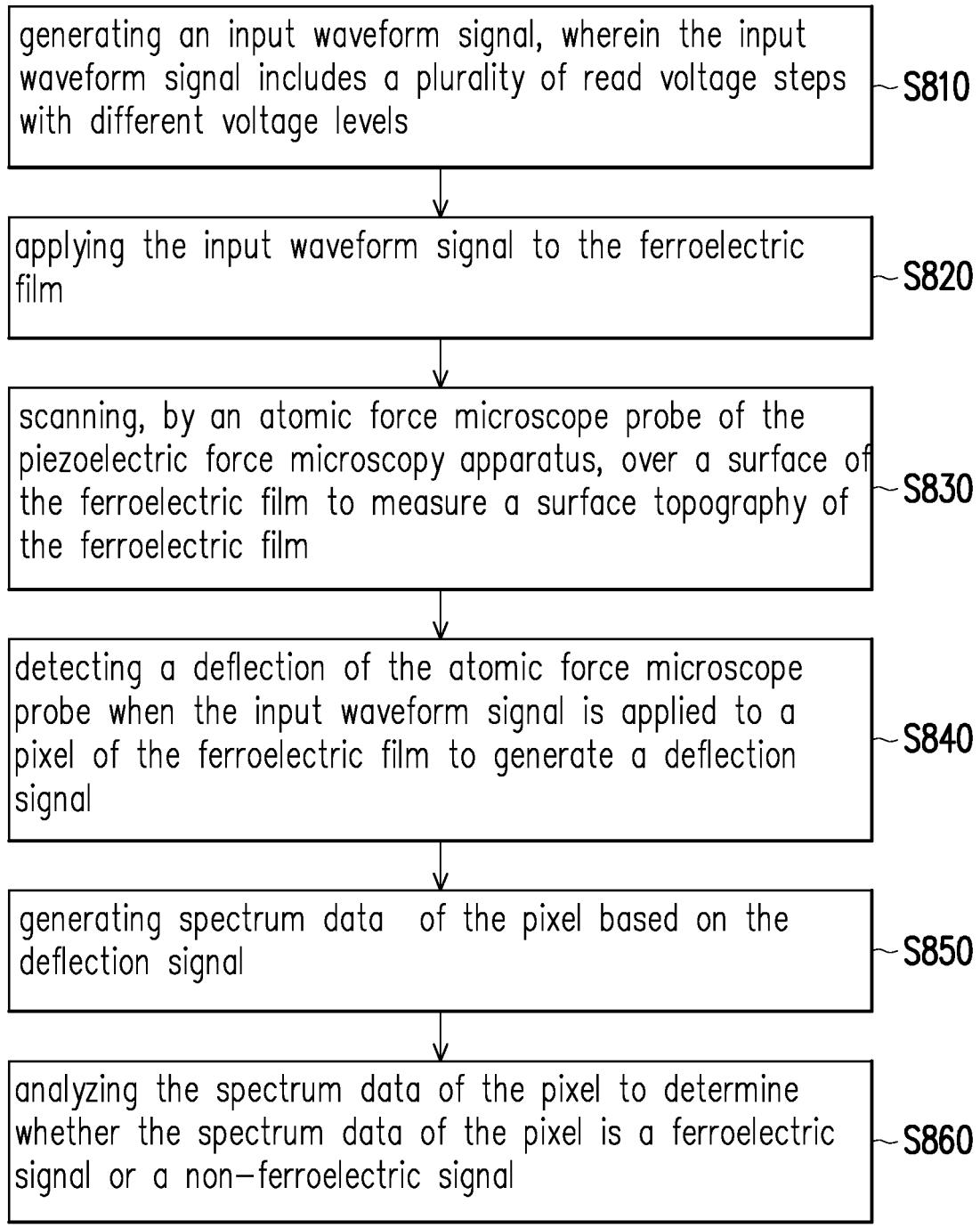
FIG. 8 is a flowchart diagram illustrating a method of detecting a ferroelectric signal from a ferroelectric film according to some embodiments.

Referring to FIG. 8, a method of detecting a FE signal from a FE film according to some embodiments is illustrated. In step S810, an input waveform signal is generated, wherein the input waveform signal includes a plurality of read voltage steps with different voltage levels. In step S820, the input waveform signal is applied to the FE film. In some embodiment, the application of the input waveform signal to the FE film form a bias voltage between the FE film and a probe tip. In step S830, a surface of the FE film is scanned by an atomic force microscope probe of the piezoelectric force microscopy apparatus to measure a surface topography of the FE film. In step S840, a deflection of the atomic force microscope probe is detected when the input waveform signal is applied to a pixel of the FE film to generate a deflection signal. In step S850, spectrum data of the pixel is generated based on the deflection signal. In some embodiments, the spectrum data of the pixel include a phase of the deflection signal. In step S860, the spectrum data of each pixel is analyzed to determine whether the spectrum data of the pixel is a ferroelectric signal or a non-ferroelectric signal.

In accordance with some embodiments, a piezoelectric force microscopy (PFM) apparatus includes a waveform generator, an atomic force microscope probe, a detector, and a processor. The waveform generator is configured to generate an input waveform signal, wherein the input waveform signal includes a plurality of read voltage steps with different voltage levels. The atomic force microscope probe is configured to scan over a surface of a ferroelectric film to measure a surface topography of the ferroelectric film. The detector is configured to detect a deflection of the atomic force microscope probe when the input waveform signal is applied to a pixel of the ferroelectric film to generate a deflection signal. The deflection signal is used to generate spectrum data of the pixel. The processor is configured analyze the spectrum data of the pixel to determine whether the spectrum data of the pixel is a ferroelectric signal or a non-ferroelectric signal.

In accordance with some embodiments, a method of detecting a ferroelectric signal from a ferroelectric film is introduced. The method includes steps of generating an input waveform signal, wherein the input waveform signal includes a plurality of read voltage steps with different voltage levels; applying the input waveform signal to the ferroelectric film; scanning, by an atomic force microscope probe of the piezoelectric force microscopy apparatus, over a surface of the ferroelectric film to measure a surface topography of the ferroelectric film; detecting a deflection of the atomic force microscope probe when the input waveform signal is applied to a pixel of the ferroelectric film to generate a deflection signal; generating spectrum data of the pixel based on the deflection signal; and analyzing the spectrum data of the pixel to determine whether the spectrum data of the pixel is a ferroelectric signal or a non-ferroelectric signal.

In accordance with some embodiments, a piezoelectric force microscopy (PFM) apparatus includes a waveform generator, an atomic force microscope probe, a detector, a lock-in amplifier, and a processor. The waveform generator is configured to generate an input waveform signal, wherein the input waveform signal includes a plurality of read voltage steps with different voltage levels. The atomic force microscope probe is configured to scan over a surface of a ferroelectric film to measure a surface topography of the ferroelectric film. The detector is configured to detect a deflection of the atomic force microscope probe when the input waveform signal is applied to a pixel of the ferroelectric film to generate a deflection signal. The deflection signal of the atomic force microscope probe is used to generate spectrum data of the pixel. The lock-in amplifier is coupled to the detector and is configured to capture a phase of the deflection signal, wherein the data spectrum of the pixel data comprises the phase of the deflection signal. The processor is configured to analyze the spectrum data of the pixel to determine whether the spectrum data of the pixel is a ferroelectric signal or a non-ferroelectric signal.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of detecting a ferroelectric signal from a ferroelectric film, adapted to a piezoelectric force microscopy apparatus, comprising:
    generating an input waveform signal, wherein the input waveform signal includes a plurality of read voltage steps with different voltage levels;
    applying the input waveform signal to the ferroelectric film;
    scanning, by an atomic force microscope probe of the piezoelectric force microscopy apparatus, over a surface of the ferroelectric film to measure a surface topography of the ferroelectric film;
    detecting a deflection of the atomic force microscope probe when the input waveform signal is applied to a pixel of the ferroelectric film to generate a deflection signal;
    generating spectrum data of the pixel based on the deflection signal; and
    analyzing the spectrum data of the pixel to determine whether the spectrum data of the pixel is a ferroelectric signal or a non-ferroelectric signal.

2. The method of claim 1, further comprising:
    capturing a probe displacement of the atomic force microscopy probe based on the deflection signal, wherein the data spectrum of the pixel comprises the probe displacement of the atomic force microscopy probe.

3. The method of claim 2, wherein
    the spectrum data comprises a first probe displacement, a second probe displacement and a third probe displacement that correspond to a first read voltage step, a second read voltage step and a third read voltage step of the input waveform signal, wherein the second read voltage step is greater than the first voltage step and is greater than the third read voltage step, and
    analyzing the spectrum data of the pixel to determine whether the spectrum data of the pixel is the ferroelectric signal or the non-ferroelectric signal comprise:
        determining whether a difference between the second probe displacement and the first probe displacement and a difference between the second probe displacement and the third probe displacement are smaller than a threshold value,
        determining that the spectrum data of the pixel is the non-ferroelectric signal in response to determining that the difference between the second probe displacement and the first probe displacement and the difference between the second probe displacement and the third probe displacement are smaller than the threshold value, and
        determining that the spectrum data of the pixel is the ferroelectric signal in response to determining that the difference between the second probe displacement and the first probe displacement and the difference between the second probe displacement and the third probe displacement are not smaller than the threshold value.

4. The method of claim 1, wherein the input waveform and a determination of the spectrum data are used as training data of a machine learning algorithm to determine rules that correlate the input waveform and a determination of whether the spectrum data is the ferroelectric signal or the non-ferroelectric signal.

5. The method of claim 1, wherein
    the input waveform signal includes a plurality of sequences in each measurement period,
    each of the read voltage steps corresponds to one of the sequences,
        a number of the sequences is equal to a number of the read voltage steps,
    each of the plurality of sequences includes a plurality of write pulses, and
    each of the plurality of write pulses is followed by at least one of the plurality of read voltage steps.

6. The method of claim 5, wherein
    each of the sequence includes a plurality of time intervals,
    each of the time intervals includes a write period where a write pulse among the plurality of write pulses is applied to the ferroelectric film and a read period where the at least one of the read voltage steps are applied to ferroelectric film, and
    the write period is non-overlap to the read period.

7. The method of claim 6, further comprising:
    recording signal timings associated with application of the at least one read voltage step and determining a selected signal timing of a selected read voltage step among the at least one read voltage step that generates the ferroelectric signal with least noise level in a testing mode; and apply the selected read voltage step associated with the selected signal timing during the read period in an operation mode.

8. The method of claim 1, wherein each of the sequence includes a plurality of time intervals, each of the time intervals includes a write period where a write pulse among the plurality of write pulses and at least one of the read voltage steps are applied to the ferroelectric film.

9. A piezoelectric force microscopy apparatus, comprising:

a waveform generator, configured to generate an input waveform signal, wherein the input waveform signal includes a plurality of read voltage steps with different voltage levels;

an atomic force microscope probe, configured to scan over a surface of a ferroelectric film to measure a surface topography of the ferroelectric film;

a detector, configured to detect a deflection of the atomic force microscope probe when the input waveform signal is applied to a pixel of the ferroelectric film to generate a deflection signal, wherein the deflection signal is used to generate spectrum data of the pixel; and a processor, configured to analyze the spectrum data of the pixel to determine whether the spectrum data of the pixel is a ferroelectric signal or a non-ferroelectric signal.

10. The piezoelectric force microscopy apparatus of claim 9, further comprising:

a lock-in amplifier, coupled to the detector, configured to capture a probe displacement of the atomic force microscopy probe based on the deflection signal, wherein the data spectrum of the pixel comprises the probe displacement of the atomic force microscopy probe.

11. The piezoelectric force microscopy apparatus of claim 10, wherein the spectrum data comprises a first probe displacement, a second probe displacement and a third probe displacement that correspond to a first read voltage step, a second read voltage step and a third read voltage step of the input waveform signal, wherein the second read voltage step is smaller than the first voltage step and is greater than the third read voltage step, when a difference between the second probe displacement and the first probe displacement and a difference between the second probe displacement and the third probe displacement are smaller than a threshold value, the processor determines that the spectrum data of the pixel is the non-ferroelectric signal, and when the difference between the second probe displacement and the first probe displacement and the difference between the second probe displacement and the third probe displacement are not smaller than the threshold value, the processor determines that the spectrum data of the pixel is the ferroelectric signal.

12. The piezoelectric force microscopy apparatus of claim 11, wherein the input waveform and a determination of the spectrum data are used as training data of a machine learning algorithm to determine rules that correlate the input waveform and a determination of whether the spectrum data is the ferroelectric signal or the non-ferroelectric signal.

13. The piezoelectric force microscopy apparatus of claim 12, wherein each of the sequence includes a plurality of time intervals, each of the time intervals includes a write period where a write pulse among the plurality of write pulses and at least one of the read voltage steps are applied to the ferroelectric film.

14. The piezoelectric force microscopy apparatus of claim 9, wherein the input waveform signal includes a plurality of sequences in each measurement period, each of the read voltage steps corresponds to one of the sequences, a number of the sequences is equal to a number of the read voltage steps each of the plurality of sequences includes a plurality of write pulses, and each of the plurality of write pulses is followed by at least one of the plurality of read voltage steps.

15. The piezoelectric force microscopy apparatus of claim 14, wherein each of the sequence includes a plurality of time intervals, each of the time intervals includes a write period where a write pulse among the plurality of write pulses is applied to the ferroelectric film and a read period where the at least one of the read voltage steps are applied to ferroelectric film, and the write period is non-overlap to the read period.

16. The piezoelectric force microscopy apparatus of claim 15, wherein in a testing mode, the processor is configured to record signal timings associated with application of the at least one read voltage step, and determine a selected signal timing of a selected read voltage step among the at least one read voltage step that generates the ferroelectric signal with least noise level, and in an operation mode, the processor is configured to apply the selected read voltage step associated with the selected signal timing during the read period.

17. A method of detecting a ferroelectric signal, adapted to a piezoelectric force microscopy apparatus, comprising:

generating an input waveform signal, wherein the input waveform signal includes a plurality of read voltage steps with different voltage levels;

applying the input waveform signal to a ferroelectric film;

detecting a deflection of an atomic force microscope probe in response to the input waveform signal is applied to a pixel of the ferroelectric film to generate a deflection signal;

generating spectrum data of the pixel based on the deflection signal and the input waveform signal; and analyzing the spectrum data of the pixel by a machine learning algorithm to determine whether the spectrum data of the pixel is a ferroelectric signal or a non-ferroelectric signal.

18. The method of claim 17, wherein the spectrum data comprises a first probe displacement, a second probe displacement and a third probe displacement that correspond to a first read voltage step, a second read voltage step and a third read voltage step of the input waveform signal, wherein the second read voltage step is smaller than the first voltage step and is greater than the third read voltage step, the machine learning algorithm is performed for:

determining a difference between the second probe displacement and the first probe displacement and a difference between the second probe displacement and the third probe displacement;

when the difference between the second probe displacement and the first probe displacement and the difference between the second probe displacement and the third probe displacement are smaller than a threshold value, the processor determines that the spectrum data of the pixel is the non-ferroelectric signal; and when the difference between the second probe displacement and the first probe displacement and the difference between the second probe displacement and the third probe displacement are not smaller than the threshold value, the processor determines that the spectrum data of the pixel is the ferroelectric signal.

19. The method of claim 17, further comprising:
scanning, by the atomic force microscope probe of the piezoelectric force microscopy apparatus, over a surface of the ferroelectric film to measure a surface topography of the ferroelectric film.

20. The method of claim 17, wherein
the input waveform signal includes a plurality of sequences in each measurement period,
each of the read voltage steps corresponds to one of the sequences,
  a number of the sequences is equal to a number of the read voltage steps,
each of the plurality of sequences includes a plurality of write pulses, and
each of the plurality of write pulses is followed by at least one of the plurality of read voltage steps.

* * * * *